Aug. 2, 1955
A. W. SEYFRIED
2,714,674
MOTOR DRIVEN DRINK MIXERS
Filed Jan. 14, 1953
3 Sheets-Sheet 1
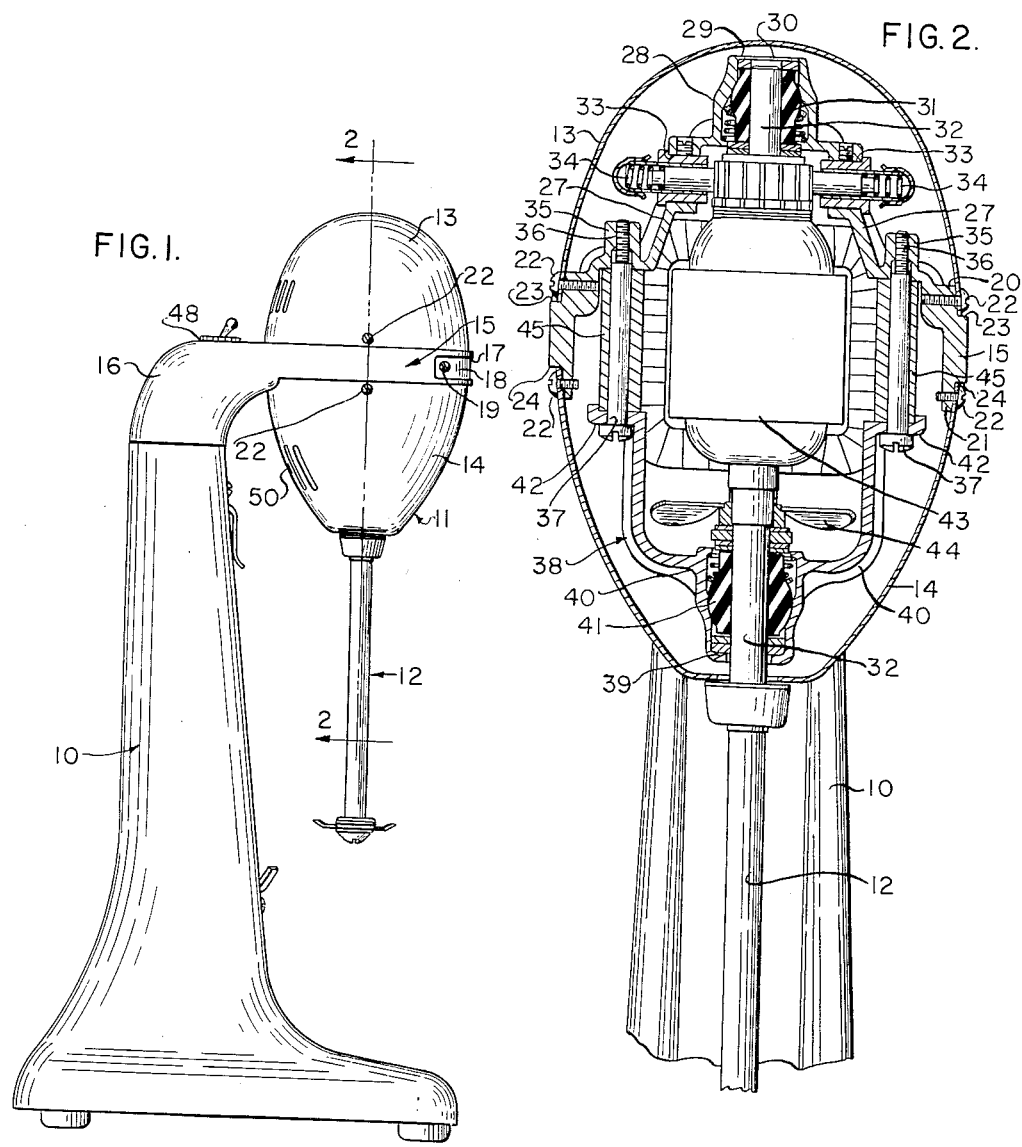
INVENTOR.
Arthur W. Seyfried
BY Bertha L. McGregor
ATTORNEY Aug. 2, 1955 A. W. SEYFRIED 2,714,674
MOTOR DRIVEN DRINK MIXERS Filed Jan. 14, 1953 3 Sheets-Sheet 2

INVENTOR.
Arthur W. Seyfried
BY Bertha L. MacGregor
ATTORNEY

Aug. 2, 1955  A. W. SEYFRIED  2,714,674
MOTOR DRIVEN DRINK MIXERS

Filed Jan. 14, 1953  3 Sheets-Sheet 3

*INVENTOR.*
Arthur W. Seyfried
Bertha L. MacGregor
ATTORNEY

United States Patent Office 2,714,674
Patented Aug. 2, 1955

2,714,674

MOTOR DRIVEN DRINK MIXERS

Arthur W. Seyfried, Racine, Wis., assignor to Scovill Manufacturing Company, Waterbury, Conn., a corporation of Connecticut Application January 14, 1953, Serial No. 331,133

6 Claims. (Cl. 310—91)

This invention relates to motor driven drink mixers, and particularly to the combination of motor housing, means for mounting motor parts within the housing and means for mounting the motor on the standard of the machine.

The main object of the invention is to provide an exceedingly simple and novel motor and housing construction in which a motor housing collar serves in several capacities, namely, (1) as part of the housing, (2) to support the motor as a whole within the housing, (3) to support the housing members, and (4) as an integral part of the means for mounting the motor and housing on the upright standard of the machine.

Heretofore, motor housing collars have been employed for decorative purposes, as name plates or as means for covering exposed edges of motor housing members. For these purposes such collars merely surround the motor housing and overlie exterior surfaces or edges without supporting any parts within the motor housing or aiding in the mounting of the motor as a whole on the machine standard or base.

My invention produces a compact mechanism streamlined in appearance, and it greatly reduces manufacturing and assembling costs.

Other advantages will be apparent from the drawings and the following specification.

In the drawings:

Fig. 1 is a side elevation of a motor driven drink mixer embodying my invention.

Fig. 2 is an elevational view, partly in section, of the upper portion of the mixer of Fig. 1, on an enlarged scale, the section being taken in the plane of the line 2—2 of Fig. 1.

Figure 3:
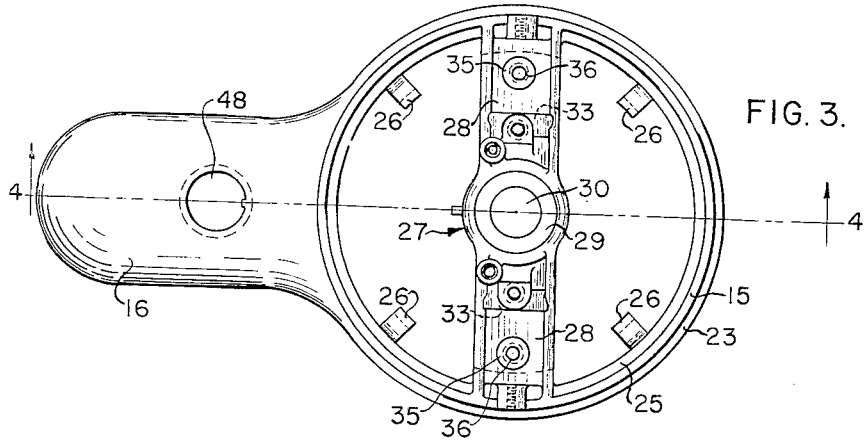
Fig. 3 is a top plan view of the motor housing collar with integral motor upper bracket and motor mounting means, detached from the rest of the machine.

Referring to Fig. 1 of the drawing, the drink mixer embodying my invention comprises an integral base and upright standard 10, a motor and housing indicated as a whole at 11, and an agitator 12 depending from the motor 11. The agitator 12 operates within a cup (not shown) as is well understood in the art.

The novel features of my invention are embodied in the motor, motor housing and means for mounting the motor and housing on the upright standard 10. The preferred embodiment of my invention is shown in Figs. 1 to 10, inclusive, in which the motor housing consists of an upper cover 13, lower cover 14 and collar 15. The collar 15 preferably is die cast zinc. The collar is ring like in form in the portion which surrounds the sides and front of the motor 11 and merges integrally with a rearwardly extending curved arm 16 which is mounted on the flat upper end of the standard 10 and connects the motor as a whole to the machine standard.

Figure 4:
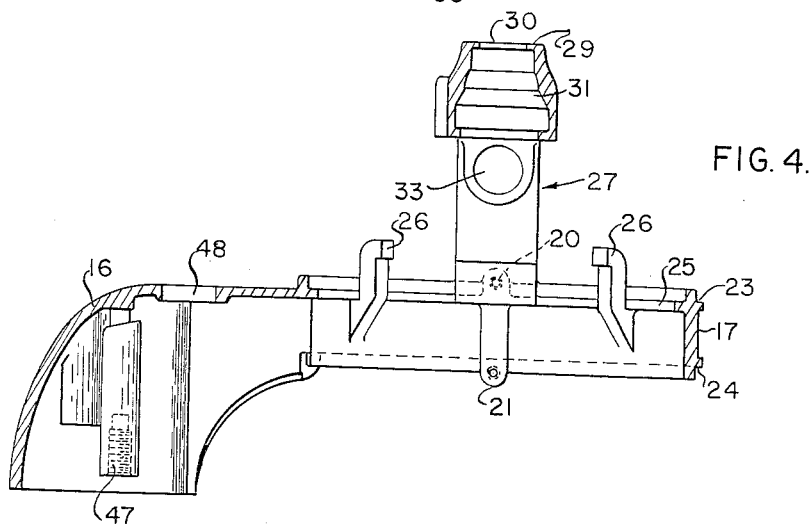
Fig. 4 is a vertical sectional view of the housing collar and integral parts, taken in the plane of the line 4—4 of Fig. 3.

On the exposed forward face of the collar 15 the surface is recessed as indicated at 17 in Fig. 4 for the reception of a name plate 18 (Fig. 1), secured to the collar by screws 19. At each side the collar 15 is provided with upwardly and downwardly extending bosses 20 and 21, respectively (Figs. 2 and 4), apertured and threaded to receive screws 22 whereby the upper and lower covers 13 and 14 are attached to the collar 15. The exposed face of the collar 15 adjacent its upper and lower edges is cut away to form shoulders 23 and 24, respectively, against which abut the free annular edges of the covers 13 and 14. An inwardly directed rib 25 on the collar 15 adds to the strength of the construction. A plurality of bosses 26, preferably four, function to locate and retain motor parts in proper position as hereinafter explained.

A motor supporting upper bracket, indicated as a whole at 27 in Fig. 4, is integrally cast with the collar 15 and arm 16. When viewed in front elevation in the motor, it resembles an inverted, irregularly formed U, with the lower ends of the two arms 28 integral with the collar 15. The upper flat central portion 29 of the bracket 27 is centrally apertured at 30 and those portions of the arms 28 just below the flat central portion 29 are shaped to form part of a journal bearing 31 for the upper end of the armature shaft 32 of the motor. Below said journal bearing 31, the arms 28 are provided with openings 33 for the reception of horizontally disposed brush holders 34 (Fig. 2). Below said openings 33, the arms 28 diverge downwardly to thickened horizontal portions 35 provided with vertically disposed threaded openings 36. These threaded holes 36 receive the threaded ends of long screws 37 which connect a motor supporting lower bracket 38 (Figs. 6–8) to said upper bracket 27.

Figure 8:
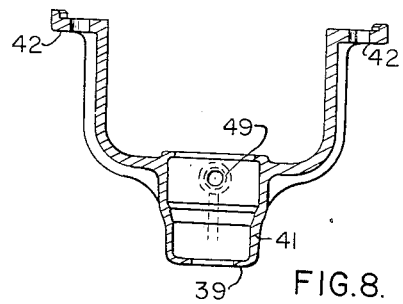
Fig. 8 is a vertical sectional view of the bracket taken in the plane of the line 8—8 of Fig. 7.

The motor lower bracket indicated as a whole at 38 is a separate part, preferably die cast zinc. As best shown in Figs. 2 and 8, it is irregularly U-shaped in side elevation, having a flat apertured bottom 39 integral with an arm 40 at each side. The arms 40 extend substantially vertically from said flat bottom 39 to form part of a journal bearing 41 for the armature shaft 32, and above said journal bearing 41 said bracket arms 40 curve outwardly and upwardly to the horizontally extending ends 42 which are apertured to receive the screws 37 which connect said lower bracket 38 to the upper bracket 27.

To assemble the motor, motor housing and mounting means, the conventional motor parts including the armature 43, fan 44 and other well known parts are mounted on the shaft 32, and inserted as a unit between the arms 28 of the upper bracket 27, with the upper end of the armature shaft 32 in the bearing 31. The bosses 26 limit the upward movement of the motor parts and aid in retaining them in position between the bracket arms 28. The lower end of the armature shaft 32 is passed through the journal bearing 41 and the apertured flat lower end 39 of the bracket 38. Said bracket 38 is moved upwardly relatively to the shaft 32 into the position shown in Fig. 2. Spacer members 45 define the distance between the parts 35 of the upper bracket 27 and 42 of the lower bracket 38. The screws 37 extend through the apertures of the bracket ends 42, through said spacers 45, and upwardly through the threaded openings 35 of the upper bracket 27, thereby connecting the upper and lower brackets securely together, and holding the motor parts in assembled relationship between said brackets.

Since the upper bracket 27 is an integral part of the collar 15, said collar serves to support the entire motor assembly, including the lower bracket 37 which is connected to the said upper bracket. As heretofore stated, the collar also carries the housing covers 13 and 14 which are secured to it by the screws 22.

Figure 5:
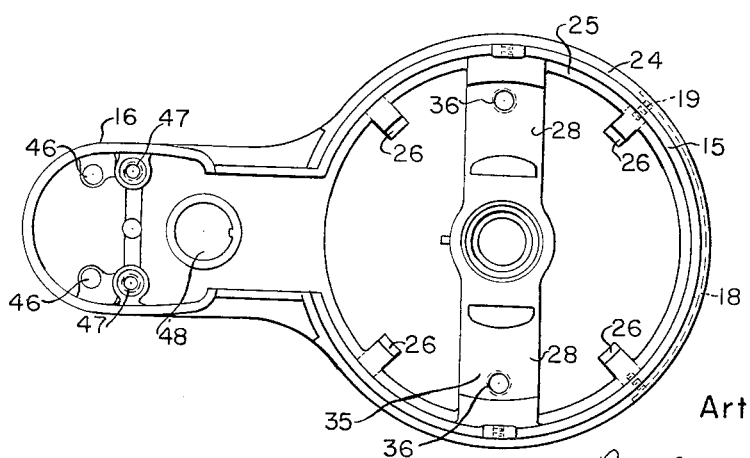
Fig. 5 is a bottom plan view of the housing collar and integral parts shown in Figs. 3 and 4.
Figure 6:
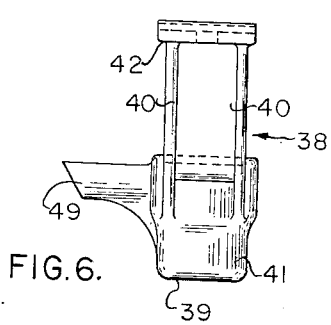
Fig. 6 is an elevational side view of the motor lower bracket.
Figure 7:
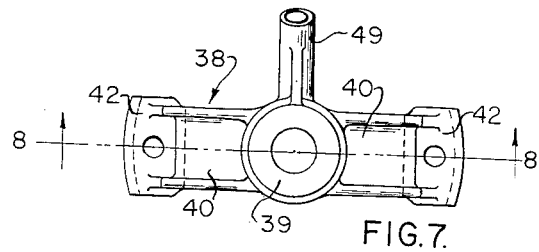
Fig. 7 is a top plan view of the bracket of Fig. 6.

After the motor parts have been mounted in the said brackets 27 and 28, the brackets connected together as explained, and covers 13 and 14 attached to the collar 15, the arm 16 is mounted on the standard 10. The mounting is facilitated by parts which preferably are cast in said arm 16 as best shown in Figs. 4 and 5. On the inner surfaces of the curved walls of the arm 16 and accessible through the open bottom (Fig. 5), are ejector pins 46 and internally threaded bosses 47 which cooperate with similar registering bosses 47 within the upper end of the standard 10, and externally threaded bolts 47' engaging said bosses 47, 47, firmly connect the curved arm 16 to said standard.

The opening 48 in the upper wall of the arm 16 accommodates an electric switch. The lower bracket 38 may be provided with an integrally cast oil conduit 49 adapted to communicate with an oil opening 50 in the housing cover 14 (Fig. 1) to convey oil to the motor.

Figure 9:
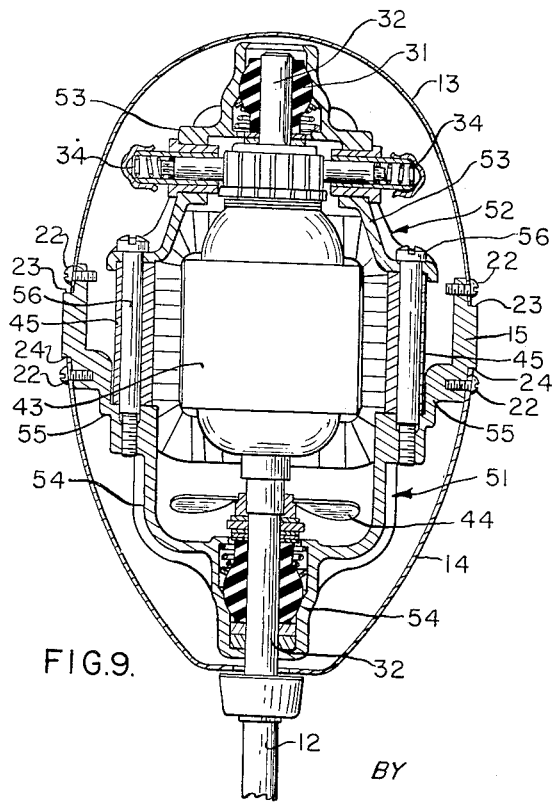
Fig. 9 is a vertical sectional view of a motor embodying a modified form of my invention.
Figure 10:
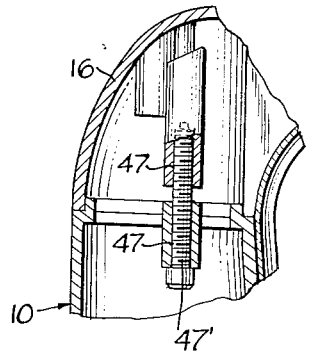
Fig. 10 is a vertical sectional view of the upper end of the standard and part of the motor mounting means.

In Fig. 9 is shown a modification of the invention which differs from the preferred form heretofore described in that the motor lower bracket 51 is integral with the collar 15 and the upper bracket 52 is a separate casting. The arms 53 of the bracket 52 closely resemble the arms 28 of the bracket 27 of Figs. 2 to 5, inclusive, excepting that said arms 53 are not parts of the collar 15. Likewise, the arms 54 of the bracket 51 closely resemble the arms 40 of the bracket 38 of Figs. 6 to 8, inclusive, excepting that said arms 54 are extended as indicated at 55 to join integrally the collar 15. The screws 56 which connect the two brackets together are reversed as compared with screws 37 (Fig. 2). In both forms of the invention (Figs. 2 and 9), the collar 15 supports the entire motor assembly, including one integrally formed bracket and one separately formed bracket, as well as the motor parts mounted in said brackets, and the motor covers which together with the collar constitute the motor housing. In both forms of the invention, also, the collar and its integrally cast or formed arm serve to mount the motor and housing, as a unit, on the upright standard or other supporting portion of the machine.

Changes may be made in details of construction and form of the parts without departing from the scope of the invention as defined by the appended claims.

I claim:

1. A motor driven drink mixer comprising a base, a standard rising from the base, a motor having a vertically disposed shaft spaced laterally from the standard, means mounting said motor on the standard comprising a collar portion surrounding the sides and front of the motor, upper and lower housing members connected to opposite annular edges of the collar portion, a curved arm portion integral with and depending substantially horizontally from said collar portion and terminating in a downturned hollow portion seated on the upper end of the standard, and securing means within the curved arm portion and standard connecting them together.

2. A motor driven drink mixer comprising a base, a standard rising from the base, a motor having a vertically disposed shaft spaced laterally from the standard, said motor comprising a collar which surrounds the sides and front of the motor, upper and lower housing members connected to opposite annular edges of the collar, a pair of brackets irregularly U-shaped in vertical section and inverted with respect to each other, one of said brackets being integral with the collar, the other bracket being detachably connected to said integral bracket, opposite upper and lower portions of said bracket forming bearings for the motor shaft, an integrally formed curved arm, said integral arm having a substantially horizontal portion which merges integrally with the collar and a downturned hollow portion seated on the upper end of the standard, and means within the curved arm and said standard connecting them together.

3. A motor driven drink mixer comprising a base, a standard rising from the base, a motor having a vertically disposed shaft spaced laterally from the standard, said motor comprising a collar which surrounds the sides and front of the motor, upper and lower housing members connected to opposite annular edges of the collar, a pair of brackets irregularly U-shaped in vertical section and inverted with respect to each other, a unit comprising conventional motor parts located between said brackets, means on the inner surface of said collar limiting the movement of said unit, one of said brackets being integral with the collar, the other bracket being detachably connected to said integral bracket, opposite upper and lower portions of said bracket forming bearings for the motor shaft, an integrally formed curved arm, said integral arm having a substantially horizontal portion which merges integrally with the collar and a downturned hollow portion seated on the upper end of the standard, and means within the curved arm and said standard connecting them together.

4. A motor driven drink mixer comprising a base, a standard rising from the base, a motor having a vertically disposed shaft spaced laterally from the standard, said motor comprising a collar which surrounds the sides and front of the motor, a plurality of apertured threaded bosses extending beyond the upper and lower edges of the collar, upper and lower housing means, means connecting said housing members to said apertured threaded bosses on the collar, an integrally formed curved arm, said integral arm having a substantially horizontal portion which merges integrally with the collar and a downturned hollow portion seated on the upper end of the standard, and means within the curved arm and said standard connecting them together.

5. The drink mixer defined by claim 1, in which the exposed face of the collar adjacent its upper and lower edges is cut away, whereby a shoulder is formed on which said housing members are seated and the exterior surfaces of the collar and housing members are flush.

6. A motor driven mixer comprising a base, a standard rising from the base, a motor having a vertically disposed shaft spaced laterally from the standard, said motor comprising a collar which surrounds the sides and front of the motor, upper and lower housing members connected to opposite annular edges of the collar, a bracket irregularly U-shaped in vertical section extending across the collar from side to side and integral with the collar, a second bracket irregularly U-shaped and inverted with respect to said first bracket and detachably secured thereto, a plurality of bosses integrally formed on the inner surface of the collar, a unit comprising conventional motor parts located between the brackets and limited in movement by said bosses, an integrally formed curved arm, said arm having a substantially horizontal portion which merges integrally with the collar and a downturned hollow portion seated on the upper end of the standard, and means within the curved arm and said standard connecting them together.

References Cited in the file of this patent

UNITED STATES PATENTS

| Number | Name | Date |
|---|---|---|
| 595,898 | Whipple et al. | Dec. 21, 1897 |
| 619,217 | Pieper et al. | Feb. 7, 1899 |
| 654,999 | Moody | July 31, 1900 |
| 727,568 | Apple | May 12, 1903 |
| 755,732 | Barker | Mar. 29, 1904 |
| 1,238,666 | Halbleib | Aug. 28, 1917 |
| 1,843,315 | Blish et al. | Feb. 2, 1932 |
| 2,258,987 | Kochner | Oct. 14, 1941 |
| 2,473,105 | Luenberger | June 14, 1949 |